United States Patent [19]

Kawai et al.

[11] Patent Number: 4,774,000
[45] Date of Patent: Sep. 27, 1988

[54] SUBMICRON DISC FILTERS

[75] Inventors: Takeshi Kawai, Kamifukuoka; Takashi Yamagishi, Tokyo; Mitsuhiro Mega, Saitama, all of Japan

[73] Assignees: Kabushiki Kaisha Tsuchiya Seisakusho, Tokyo; Nitto Electric Industrial Co., Ltd., Ibaragi, both of Japan

[21] Appl. No.: 925,204

[22] Filed: Oct. 31, 1986

[30] Foreign Application Priority Data

Nov. 1, 1985 [JP] Japan .............................. 60-168838[U]
Nov. 28, 1985 [JP] Japan .............................. 60-182276[U]
Nov. 28, 1985 [JP] Japan .............................. 60-182277[U]
Oct. 15, 1986 [JP] Japan .............................. 61-245124

[51] Int. Cl.$^4$ ............................................. B01D 25/04
[52] U.S. Cl. ................................. 210/321.6; 210/346; 210/486; 210/488; 55/484; 248/94
[58] Field of Search ................... 210/323.1, 345, 346, 210/347, 486, 314, 488, 321.6; 248/94; 55/484, 485

[56] References Cited

U.S. PATENT DOCUMENTS

| | | | |
|---|---|---|---|
| 2,630,228 | 3/1953 | Wright et al. | 210/346 |
| 2,697,524 | 12/1954 | Foust | 210/346 |
| 3,343,681 | 9/1967 | Madden | 210/346 |
| 3,397,785 | 8/1968 | Jaruis et al. | 210/346 |
| 3,398,834 | 8/1968 | Nuttall et al. | 210/346 |
| 4,501,663 | 2/1985 | Merrill | 210/347 |

FOREIGN PATENT DOCUMENTS

| | | | |
|---|---|---|---|
| 599089 | 10/1959 | Italy | 210/345 |
| 58-137408 | 9/1983 | Japan | |
| 59-20804 | 2/1984 | Japan | |
| 59-102111 | 7/1984 | Japan | |

Primary Examiner—Richard V. Fisher
Assistant Examiner—Wanda L. Millard
Attorney, Agent, or Firm—Foley & Lardner, Schwartz, Jeffery, Schwaab, Mack, Blumenthal & Evans

[57] ABSTRACT

A precision filter for accomplishing filtering of precision of submicron order. A filter element of the filter consists of a plurality of superposed disc-shaped annular support members for filter membranes. Each support member has a radially outwardly extending intermediate section located between an annular boss section and an outer frame section. The intermediate section is formed on its upper and lower sides with a plurality of gently winding elongate ridges and largely winding elongate ridges. Each largely winding elongate ridge extends from the boss section to the outer frame section, but each gently winding elongate ridge located between the two largely winding elongate ridges is separate from the boss section thereby to form two elongate winding grooves which are joined and continuous to a central opening of the boss section. The thus formed support member intermediate section is sealingly covered with the filter membrane so that filtrate flows along the elongate winding grooves to reach the boss section central opening.

30 Claims, 6 Drawing Sheets

SUBMICRON DISC FILTERS

BACKGROUND OF THE INVENTION

1. Field of the Invention

The present invention relates generally to a submicron disc filter in use for filtering various chemicals, pure water and various gases, and more particularly to an improvement in such a submicron disc filter having a filter element constituted by superposing a plurality of filter units each including a support member and filter membranes.

2. Description of the Prior Art

In connection with filtering various pharmaceuticals, chemicals and gases in use for production of electronic parts, and pure water used in food industry, such filters are required to have chemical-resistance, heat-resistance, and a filter precision of submicron order. Accordingly, a variety of submicron disc filters for such ultrafiltration have been proposed and used. One of such submicron disc filters is configured as follows: The filter consists of a filter element housed in a casing. The filter element includes a plurality of superposed filter units. The filter unit is constructed of a disc-type annular support member whose major parts on its both sides or surfaces are covered with porous filter membranes for ultrafiltration. Each support member is constructed of upper and lower counterparts which are secured to each other. Each counterpart is of the type of a grid to support the filter membrane thereon. Additionally, fluid flow passages are formed between the upper and lower counterparts so that filtrate after filtration with the filter membrane flows along the fluid flow passages to an axial fluid flow passage formed axially in the filter element.

However, in such a submicron disc filter of the above-mentioned construction, the structure of each support member for the filter membranes is considerably complicated and therefore difficult to produce. In this connection, high precision is required in production of the support member counterpart because the two support member counterparts are fitted with each other to form a support member. Additionally, such a structure unavoidably inceases the thickness of each support member, so that it is difficult to increase the number of filter units of the filter element in a casing having a limited volume. This makes it difficult to increase the filtering area of the filter element, thereby allowing pressure drop increase and filter life shortening. Furthermore, since the surface of the support member is grid-shaped, angular corners and edges tend to be formed on the support member surface on which the considerably thin and soft filter membrane is supported receiving fluid pressure of the fluid to be filtered. Accordingly, when a high fluid pressure acts on the filter membrane particularly in th event that clogging proceeds, concentrated stress is generated at the angular corners and edges, thereby stretching the filter membrane to enlarge the pore size thereof or to tear the filter membrane.

SUMMARY OF THE INVENTION

A precision filter of the present invention consists of a plurality of annular support members for a filter membrane. Each support member includes an annular boss section having a central opening, an annular outer frame section, and an intermediate section radially outwardly extending between the boss section and the outer frame section. The annular support members are disposed one upon another in such a manner that the central openings of the support members are axially aligned with each other. The intermediate section of the support member is formed with a plurality of curved ridges lying on the upper and lower sides of the support member. The curved ridge projects axially from the surface of the base of the intermediate section to form a land. The curved ridge has a first end connected to the outer frame section and a second end connected to the boss section so as to form an elongate groove continuing to the center opening of the boss section. The porous filter membrane sealingly covers at least the support member intermediate section so as to define on the opposite sides thereof a dirty side and a clean side on which the intermediate section is positioned.

Accordingly, the structure of each support member for the filter membrane is very simple and therefore easy to produce. such a simple structure of the support member minimizes the thickness of the support member, thereby increasing the number of the support members housed in a casing having a limited volume. Consequently, the filtering area is increased thereby to decrease pressure drop and prolong filter life. Furthermore, no angular corner and edge are formed on the surface of the support member and therefore the filter membrane is prevented from its pore size enlargement and tearing.

BRIEF DESCRIPTION OF THE DRAWINGS

The features and advantages of the submicron disc filter according to the present invention will be more clearly appreciated from the following description taken in conjunction with the accompanying drawings in which like reference numerals designate corresponding elements and parts, and in which.

DETAILED DESCRIPTION OF THE INVENTION

Figure 1:
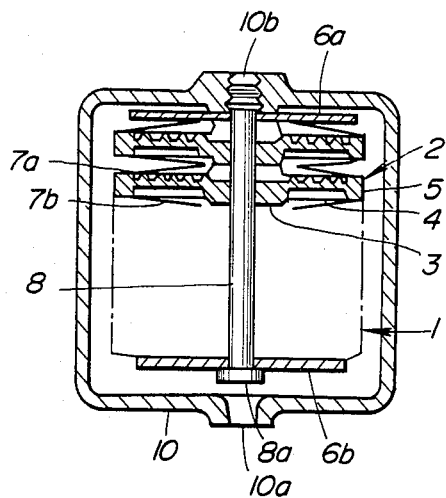
FIG. 1 is a vertical sectional view of a first embodiment of a submicron disc filter according to the present invention.
Figure 2A:
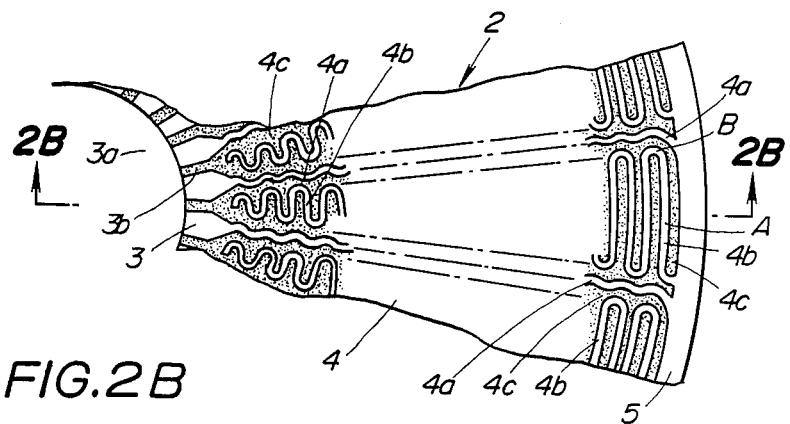
FIG. 2A is a fragmentary plan view of each support member for a filter membrane, of the filter of FIG. 1.
Figure 2B:
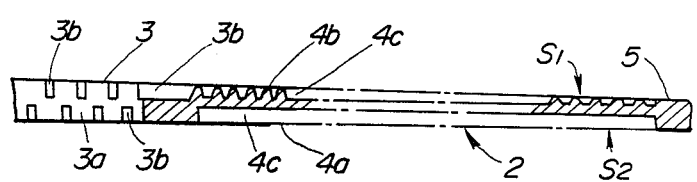
FIG. 2B is a sectional view taken in the direction of arrows substantially along the line 2B—2B of FIG. 2A.

Referring now to FIGS. 1, 2A and 2B, a preferred embodiment of a submicron disc filter according to the present invention is illustrated. The filter consists of a filter element 1 which includes a plurality of annular support members 2. Each support member 2 is made of a chemical-resistant and heat-resistant plastic such as ethylene tetrafluoride, polypropylene or nylon. The support member 2 is formed as a one-piece and includes an annular boss section 3, an annular outer frame 5, and an annular intermediate section 4 which extends radially outwardly so as to integrally connect the boss section 3 and the outer frame 5. The support members 2 are superposed one upon another in such a manner that the boss sections 3 of the adjacent support members 2 are in sealing contact with each other. Accordingly, the successive central openings 3a of the boss sections 3 of the superposed support members 2 form an axial fluid flow passage. Additionally, upper and lower end plates 6a, 6b are so disposed as to contact with the boss sections 3, 3 of the upper-most and lower-most support members 2, 2, respectively.

Upper and lower annular porous filter membranes 7a, 7b are disposed to cover the upper and lower sides of the intermediate section 4 of each support member 2, maintaining fluid-tight seal. The filter membrane 7a, 7b is made of a plastic such as ethylene tetrafluoride. More specifically, the outer peripheral section of the upper filter membrane 7a is secured to the upper surface of the outer frame section 5 of each support member 2 by welding, whereas the inner peripheral section of the upper filter membrane 7a is secured to the inner peripheral section of the lower filter membrane 7b for the support member 2 located upon the above-mentioned support member 2 by welding as shown in FIG. 1. The filter membrane 7a, 7b defines outside a dirty side where fluid to be filtered flows, and inside a clean side where filtrate flows. Thus, the support member 2 and upper and lower filter membranes 7a, 7b constitute a filter unit (not identified). The inner peripheral portion of the upper filter membrane 7a for the upper-most support member 2 is secured to the upper end plate 6a by welding. Similarly, the inner peripheral portion of the lower filter membrane 7b for the lower-most support member 2 is secured to the lower end plate 6b by welding though not shown. The thus configured filter element 1 is fixedly disposed within a casing 10 by fixing the filter element 1 with a center bolt 8. The center bolt 8 is screwed into a threaded filtrate outlet 10b formed through a boss section of the casing 10, in which a head 8a of the bolt 8 is in contact with the lower end plate 6b. The center bolt 8 is formed with an axial groove (not shown) to establish fluid communication between the axial fluid passage and the outside of the casing 10 via the filtrate outlet 10b. An inlet 10a for fluid to be filtered is formed in the casing 10 at a location in the vicinity of the lower end plate 6b. It will be understood that the end plates 6a, 6b, the center bolt 8 and the casing 10 may be made of a plastic, the same as or similar to the support member 2.

As clearly shown in FIGS. 2A and 2B, a plurality of gently curving or winding elongate ridges 4a and largely curving or winding elongate ridges 4b are formed in the upper side $S_1$ of the intermediate section 4 of the support member 2. Each ridge projects from the surface of base of the intermediate section 4 to form a land, in which the level of the top of each ridge 4a, 4b is equal to or axially inside the level of the upper or lower surface of the outer frame 5. In other words, the level the top of each ridge 4a, 4b does not project over the level of the upper or lower surface of the outer frame 5. Each gently winding ridge 4a has an outer end integrally connected with the outer frame 5 and an inner end integrally connected with the boss section 3. Each largely winding ridge 4b has an outer end integrally connected with the outer frame 5 and an inner end which is located near the boss section 3 but is not connected with the boss section 3. A winding groove 4c is formed between each gently winding ridge 4a and each largely winding ridge 4b. In other words, two winding grooves 4c, 4c are formed on the opposite sides of the largely winding ridge 4b, in which the two winding grooves 4c, 4c are joined with each other at a location in the vicinity of the outer end of the largely winding ridge 4b and continues to an upper cut-out groove 4a which axially extends from the upper surface of the boss section 3 to an axially central part of the boss section 3. The upper cut-out groove 3b radially extends and communicates with or merges in the central opening 3a of the boss section 3. As shown, each of the gently and largely winding elongate ridges 4a, 4b extends generally radially. The gently winding ridge 4a has a generally constant width of winding, whereas the largely winding ridge 4b has a width of winding which width increases in a radial direction of from the boass section 3 toward the outer frame 5. The largely winding ridges 4b has arcuate segments A which are generally parallel with each other, in which the length of the arcuate segment A increases in the direction of from the boss section 3 toward the outer frame 5. It is to be noted that the adjacent arcuate segments A are integrally connected to each other with a rounded segment B. It will be understood that the gently and largely winding ridges 4a, 4b are located close to each other to prevent the groove 4c from being widened.

Similarly to on the upper side $S_1$ of the support member intermediate section 4, a plurality of the gently and largely winding ridges 4a, 4b are formed also on the lower side $S_2$ of the support member intermediate section 4 in the same manner as in the upper side $S_1$ of the support member intermediate section 4. However, the circumferential locations of the corresponding ridge on the upper and lower sides $S_1$, $S_2$ shift or are different from each other as shown in FIG. 2B. The groove 4c on the lower side $S_2$ of the support member intermediate section 4 continues to the lower cut-out groove 3b which extends from the lower surface of the boss section 3 to an axially central part of the boss section 3. The lower cut-out groove 3b extends radially and communicates with or merges in the central opening 3a of the boss section 3.

While only the gently and largely winding elongate ridges 4a, 4b have been shown and described as ridges formed in the support member intermediate section 4, it will be understood that other ridges having other shapes may be employed in place of the ridges 4a, 4b, in which it is required that the ridges include ridges connecting the boss section 3 and the outer frame section 5 so as to narrow grooves continuing to the cut-out grooves 3b of the boss section 3. While the circumferential locations of the corresponding ridges on the upper and lower sides $S_1$, $S_2$ of the support member intermediate section 4 have been shown and described as different from each other in the first embodiment, it will be appreciated that the corresponding ridges on the upper and lower sides $S_1$, $S_2$ are positioned at the same circumferential locations so that the same or similar ridges may be located symmetrical with respect to a center plane (not shown) of the intermediate section 4 which plane is parallel with the base surface of the intermediate section.

With the thus configured submicron disc filter, the fluid (liquid) to be filtered enters through the inlet 10a of the casing 10 and flows through an annular space between the filter element 1 and the inner peripheral surface of the casing 10. Then, the fluid passes through the filter membranes 7a, 7b and enters the inside of the filter membranes, thereby accomplishing precision filtering of the fluid. The thus-filtered fluid or filtrate flows along the grooves 4c formed on the upper and lower sides $S_1$, $S_2$ of the support member intermediate section 4 and reaches to the central opening 3 of the boss section 3 or the axial fluid flow passage. Thereafter, the fluid flows through the axial groove of the center bolt 8 and the filtrate outlet 10b to be discharged out of the casing 10.

As appreciated from the above, according to the thus configured submicron disc filter, each support member 2 for the filter membrane can be produced simply by forming curved and elongate grooves on both side surfaces $S_1$, $S_2$ of a flat annular disc material. This may simplify the production process of the support member even in the case of producing it by injection moulding. Such a simple structure of the support member contributes to minimizing the thickness of the support member, so that the number of support members of the filter element can be increased even in a casing having a limited volume. This increases filtering area of the filter element, thus suppressing pressure drop at a lower value and prolonging filter life. Furthermore, since the elongate ridges of the support member are curved and rounded to prevent formation of angular corners and edges on the surface of the support member on which the filter membrane is supported, the filter membrane is prevented from receiving concentrated stress even when high fluid pressure acts on the filter membrane, thereby avoiding local stretching of the filter membrane. This prevents pore size of the filter membrane from locally enlarging or the filter membrane from tearing.

Figure 3:
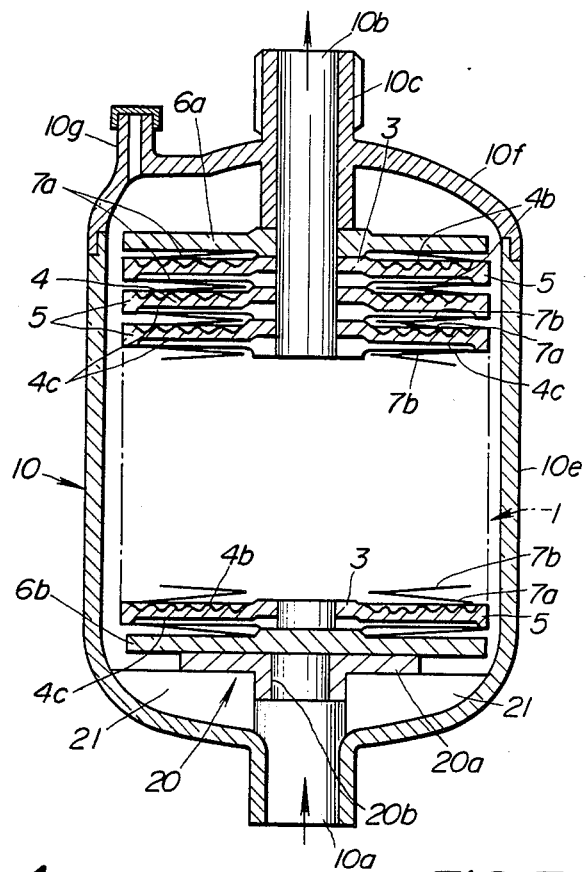
FIG. 3 is a vertical sectional view of a second embodiment of the submicron disc filter according to the present invention.
Figure 4:
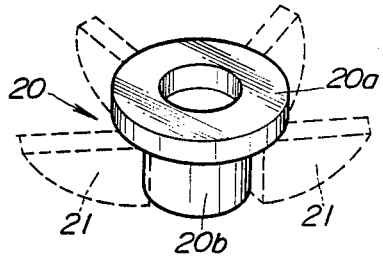
FIG. 4 is a perspective view of a spacer used in the filter of FIG. 3.

FIGS. 3 and 4 illustrate a second embodiment of the precision filter in accordance with the present invention, which is similar to the first embodiment with the exception that the filter element 1 is fixedly disposed within the casing 10 by interposing a spacer 20 between the filter element 1 and a plurality of radially disposed ribs 21 formed on the bottom inner surface of the casing 10. In this embodiment, the casing 10 consists of a container section 10e and a cover section 10f which are secured to each other by welding. The ribs 21 are disposed on and integral with the inner bottom surface of the container section 10e in such a manner as to be located around an extension of the fluid inlet (opening) 10a.

The spacer 20 includes an annular flange section 20a having a predetermined thickness, and a support cylinder section 20b. As shown in FIG. 4, the spacer 20 is so disposed that the support cylinder section 20b is located inside of the radially arranged ribs 21 whereas the flange section 20a is interposed between the upper face of the ribs 21 and the lower end plate 6b of the filter element 20 so that the flange section 20a urgingly contacts with the lower end plate 6b. By virtue of this spacer 20, the filter element 1 is biased upwardly so that the upper end plate 6a urgingly contacts with a cylindrical section 10d formed inside the casing cover section 10f. The cylindrical section 10d is aligned with the filtrate outlet pipe 10c defining therein the outlet (opening) 10b. The upper end plate 6a is secured to the cylindrical section 10d by welding. The casing cover section 10f is provided with an air vent pipe 10g through which air or gas within the casing 10 is vented.

With this arrangement, in the event that the filter element 1 constructed of the superposed disc-type filter units cannot be housed in the casing 10 owing to scattering of thicknesses of the respective support members 2, one or two filter units are removed and then the spacer having such a flange thickness as to be able to maintain a suitable distance or space between the adjacent filter units is selected and installed on the ribs 21. Otherwise, in the event that the whole height of the filter element 1 is too small so that the distance between the adjacent filter units is enlarged when installed in position as it is, the spacer having such a flange thickness as to avoid clearance enlargement is selected to be installed on the ribs 21.

Figure 5:
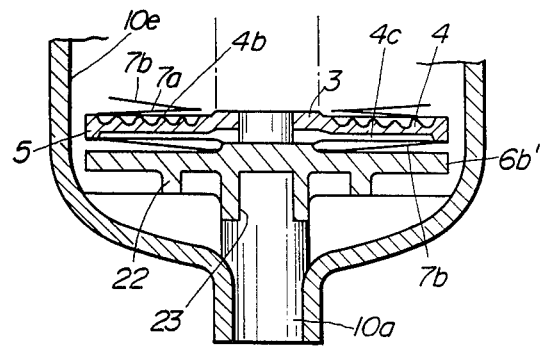
FIG. 5 is a fragmentary vertical sectional view of a modified example of the second embodiment submicron disc filter.

Accordingly, a suitable distance or space is maintained between the adjacent filter units thereby avoiding abnormal tension applied to welded parts of the filter membranes and abnormal expansion of the filter membrane, even when fluid (liquid) enters the inside of the casing 10 through the inlet 10a so that a fluid pressure acts on the filter membrane 7a, 7b in a direction from the outside to the inside of the filter membrane 7a, 7b during operation of the filter, or even when a fluid pressure acts on the inner surface of the filter membrane from the inside through the outlet 10b during stopping of operation of the filter. It will be appreciated that, for the same purpose, the separate spacer 20 may not be used in which the lower end plate 6b' is formed at its lower surface with an annular projection 22 having a predetermined thickness as shown in FIG. 5. The annular projection 22 is in contact with the upper surface of the ribs 21. Additionally, the lower end plate 6b' is formed at the lower surface with a cylindrical section 23 located among the ends of the ribs 21.

Figure 6:
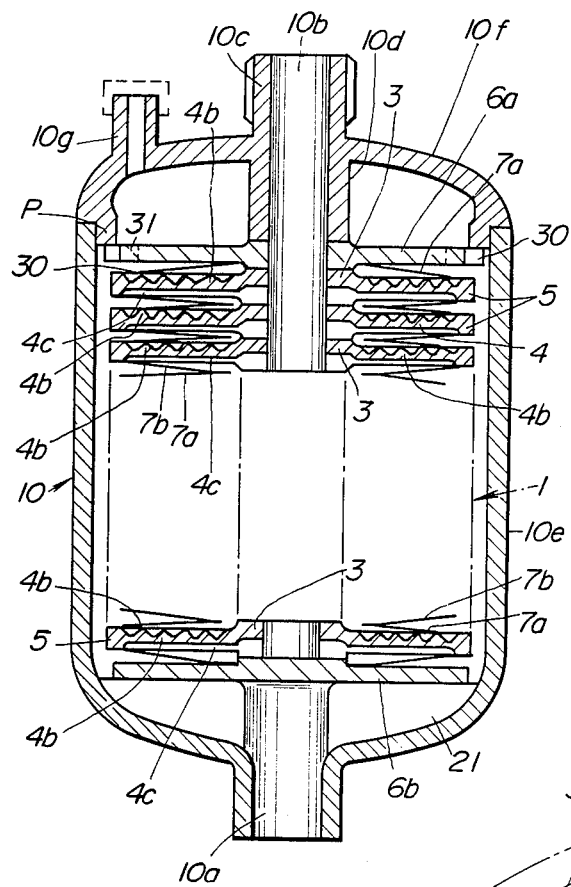
FIG. 6 is a vertical sectional view of a third embodiment of the submicron disc filter according to the present invention.
Figure 7:
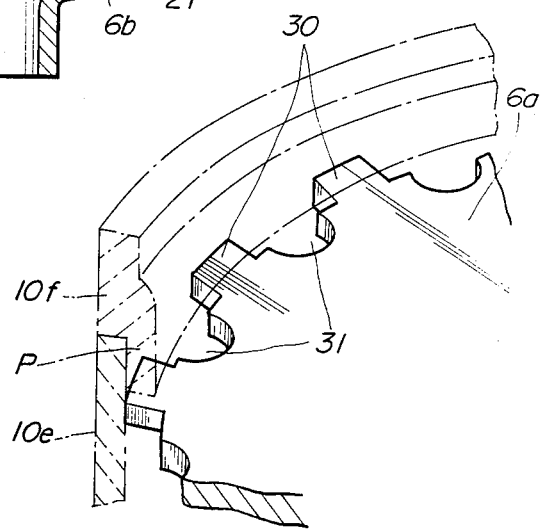
FIG. 7 is a fragmentary perspective enlarged view of an essential part of the filter of FIG. 6.

FIGS. 6 and 7 illustrate a third embodiment of the submicron disc filter according to the present invention, which is similar to the second embodiment of FIG. 3 with the exception that the spacer 20 is removed so that the ribs 21 are in direct contact with the lower end plate 6b. In this embodiment, the upper end plate 6a is formed at its outer periphery with a plurality of projections 30 which project radially outwardly and located at predetermined intervals. Additionally, the upper end plate 6a is formed at its outer periphery with grooves 31 which extend radially inwardly, each groove being located between the adjacent two projections 30. The projections 30 are in contact with an annular inner peripheral portion P of the casing cover section 10f so that the outer peripheral section of the upper end plate 6a is prevented from its upward deformation.

With this arrangement, during operation of the filter, air within the casing 10 is pushed upwardly through the grooves 31 and released through the air vent pipe 10g to the outside of the casing 10. During stopping of operation of the filter, a reverse fluid pressure acts on the inner surface of the filter membranes 7a, 7b of the filter element 1 through the filtrate outlet 10b connected to a fluid circuit so that the outer peripheral section of each filter unit (or support member 2) will be deformed upwardly; however, each filter unit is prevented from such deformation because the upper end plate 6a is restrained by the casing cover section 10f. Accordingly, the distance or space between the adjacent filter units can be maintained constant, thereby preventing the filter membrane from its inflation.

Figure 8A:
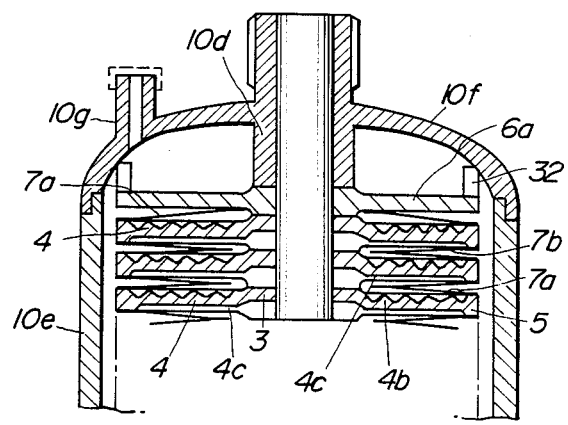
FIG. 8A is a fragmentary vertical sectional view of a fourth embodiment of the submicron disc filter according to the present invention.
Figure 8B:
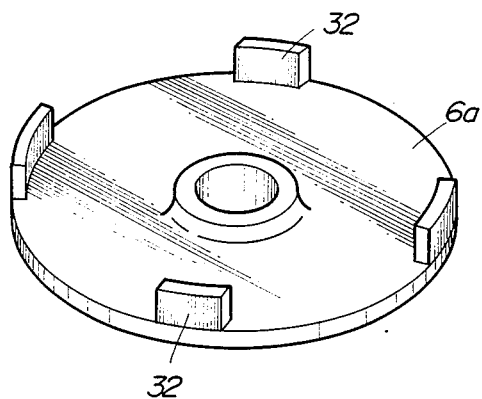
FIG. 8B is a perspective view of an upper end plate of the filter of FIG. 8A.
Figure 9:
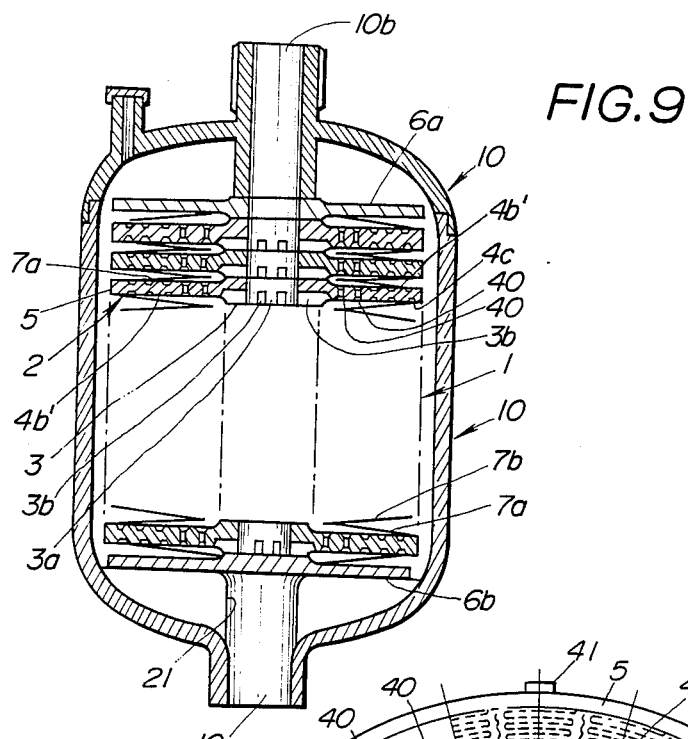
FIG. 9 is a vertical sectional view of a fifth embodiment of the submicron disc filter according to the present invention.
Figure 10:
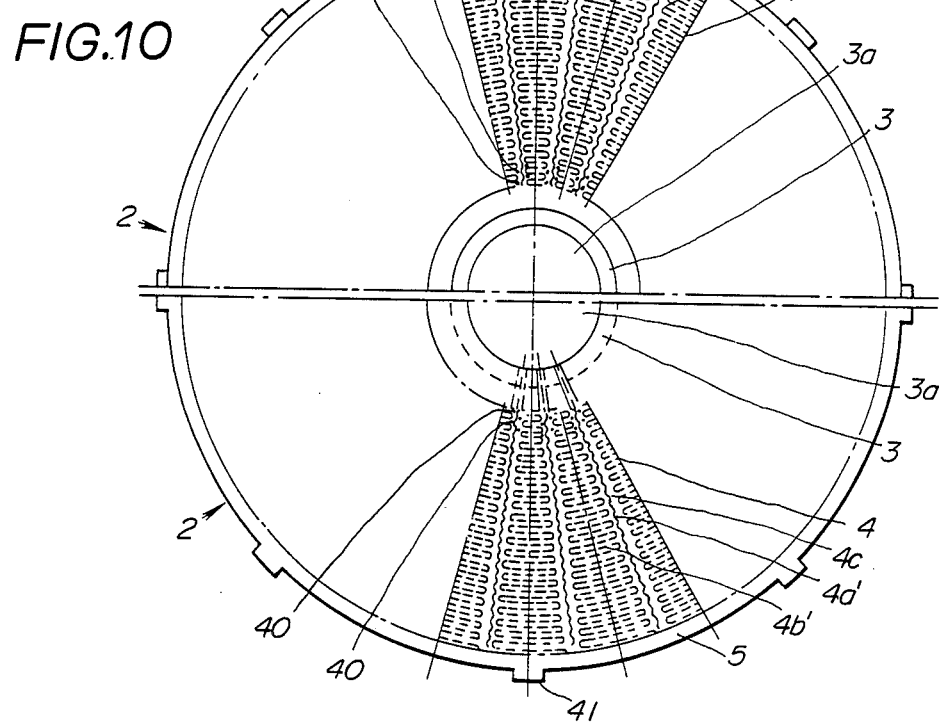
FIG. 10 is a plan view of a support member of the filter of FIG. 9, illustrated as two divided parts.

FIGS. 8A and 8B illustrate a fourth embodiment of the submicron disc filter in accordance with the present invention, which is similar to the third embodiment of FIGS. 6 and 7 except for the shape of the upper end plate 6a. In this embodiment, the upper end plate 6a is formed at its outer peripheral section with four projections 32 located at prdetermined intervals. Each projection 32 extends vertically upwardly from the upper surface of the upper end plate 6a and adapted to be in contact with the inner surface of the casing cover section 10f. Accordingly, with this arrangement, the upper end plate 6a and the support members 2 are prevented from their upward deformation like in the third embodiment. Additionally, since the inner diameter of the upper end plate 6a is considerably smaller than the inner diameter of the casing container section, there arises no trouble in air venting at starting of operation of filter.

Figure 11:
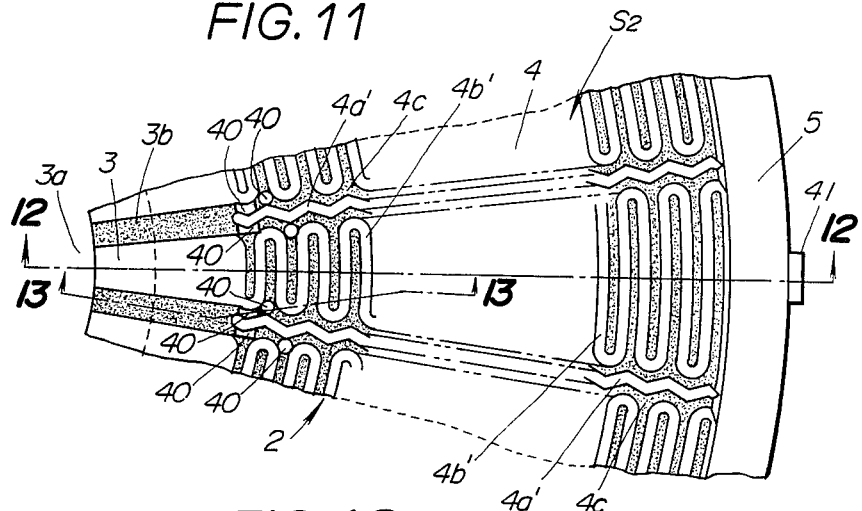
FIG. 11 is a fragmentary plan view of a support member as viewed from the reverse side thereof.
Figure 12:
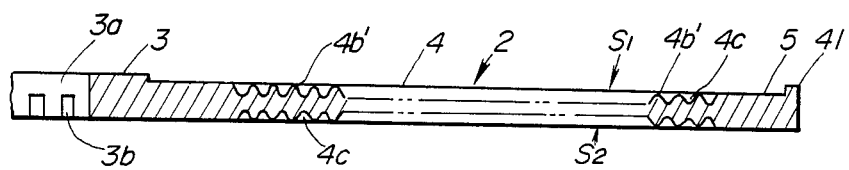
FIG. 12 is a sectional view taken in the direction of arrows substantially along the line 12—12 of FIG. 11.

FIGS. 9 to 13 illustrate a fifth embodiment of the precision filter in accordance with the present invention, which is similar to the third embodiment except for the shape of each support member 2 and the upper end plate 6a. In this embodiment, each support member 2 is formed on both sides $S_1$, $S_2$ of the intermediate section 4 with the largely winding elongate ridges 4b' and the gently winding elongate ridges 4a'. The corresponding ridges 4a' or 4b' on the upper and lower sides $S_1$, $S_2$ are located symmetrical with respect to the central plane (not identified) of the intermediate section 4 which plane is parallel with the base surface of the intermediate section 4 as shown in FIG. 12. Each largely winding elongate ridges 4b' has an outer end connected to or integral with the outer frame 5 and an inner end connected to or integral with the boss section 3, whereas each gently winding elongate ridge 4a' has an outer end connected or integral with the outer frame 5 and an inner end which is located in the vicinity of the boss section 3 and does not connect to the boss section 3. As shown in FIG. 11, the inner end of each gently winding ridge 4a' on the lower side $S_2$ is located at the entrance of the groove 3b of the boss section 3 in such a manner as not to connect with the boss section 3. The winding groove 4c is formed between the largely winding ridge 4b' and the gently winding ridge 4a' on the upper and lower sides $S_1$, $S_2$ of the support member 2. It is to be noted that the winding groove 4c is continuous to the cut-out groove 3b of the boss section 3 only on the lower side $S_2$, so that the winding groove 4c on the upper side $S_1$ does not continue to the cut-out groove 3b on the upper side $S_1$ as shown in FIG. 12.

Figure 13:
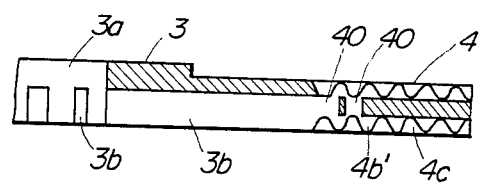
FIG. 13 is an enlarged sectional view taken in the direction of arrows substantially along the line 13—13 of FIG. 11.

As clearly shown in FIG. 11 and 13, two communication through-holes 40, 40 and the other two communication through-holes 40, 40 are respectively located on the opposite sides of the gently winding groove 4c and in the two winding grooves 4c, 4c between which the gently winding rdge 4a' is located. The two through-holes 40, 40 are positioned in the vicinity of the boss section 3. Each through-hole 40 passes through the base of the intermediate section 4 to establish fluid communication between the corresponding winding grooves 4c, 4c on the upper and lower sides $S_1$, $S_2$ of the support member intermediate section 4, so that fluid (liquid) flowing along the winding groove 4c on the upper side $S_1$ flows through the through-hole 40 to the winding groove 4c on the lower side $S_2$ to reach to the cut-out groove 3b of the boass section 3 on the lower side $S_2$. It will be appreciated that the location, cross-sectional area, and shape of each communication through-hole 40 may be suitably selected in accordance with the flow rate of filtrate, the shape of the winding ridges 4a', 4b' and the like.

In this embodiment, each support member 2 is formed at its outer periphery with a plurality of spacer projections 41 each of which projects upwardly over the level of the upper surface of the outer frame section 5 of the support member 2 so that a suitable space is maintained between the adjacent support members 2, 2.

With this embodiment, by virtue of the above-mentioned communication through-holes 40, it is allowed to form the cut-out grooves 3b of the boss section 3 only on the lower side $S_2$ of the support member 2 thereby to minimize the axial length or thickness of the boss section 3. This increases the number of the superposed support members 2 even in the casing 10 having a limited volume, thus enlarging filtering area.

Figure 14:
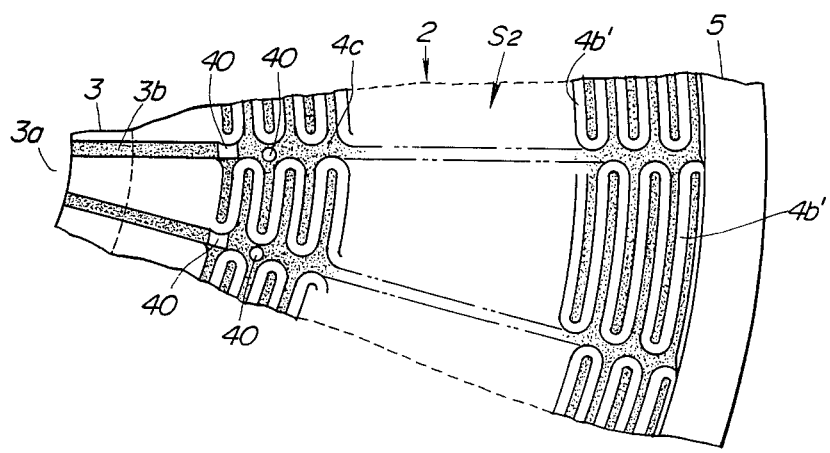
FIG. 14 is a fragmentary plan view similar to FIG. 11 but showing a sixth embodiment of the submicron disc filter according to the present invention.

FIG. 14 illustrates a sixth embodiment of the submicron disc filter according to the present invention, similar to the fifth embodiment of FIGS. 9 to 13. In this embodiment, only the largely winding elongate riges 4b' are formed on the both sides $S_1$, $S_2$ so that the winding groove 4c is formed between the largely winding ridges 4b', 4b'. Only the winding grooves 4b' on the lower side $S_2$ continue respectively to the cut-out grooves 3b of the boss section 3 because no cut-out groove 3b is formed on the upper side $S_1$ of the boss section 3. The two communication through-holes 40, 40 are located in the winding groove 4c and in the vicinity of boss section 3. Each through-hole 40 is formed through the base of the intermediate section 4 in such a manner that fluid (liquid) flowing along the winding groove 4c on the upper side $S_1$ flows through the through-holes 40, 40 to the corresponding winding groove 4c on the lower side $S_2$ to reach to the cut-out groove 3b of the boss section 3 of the support member 2.

While at least one of the winding ridges 4a(4a'), 4b(4b') has been shown and described as being connected to the outer frame section 5 and the boss section 3 in all the embodiments, it will be appreciated that the corresponding ridge may be separate from the outer frame 5 and/or the boss section 3.

What is claimed is:
1. A filter for fluid, comprising:
 a plurality of one-piece annular support members each of which includes an annular boss section having a central opening, an annular outer frame section, and an intermediate section radially outwardly extending between said boss section and said outer frame section, said plurality of support members including first and second support mem- bers, said first support member being located above said second support member;

means for securely disposing said support members one upon another in a manner that the central openings of said support members are axially aligned with each other;

means defining a plurality of curved and winding continuous ridges in said intermediate section on upper and lower sides of said support member, each of said ridges projecting axially from surface of base of said intermediate section to form a land, each ridge extending generally radially and having a first end extending toward said outer frame section, and a second end extending toward said boss section so as to form an elongate groove between adjacent said ridges, said elongate groove continuing to the center opening of said boss section, said ridges including ridges each having a plurality of arcuate segments generally parallel with each other, and a plurality of rounded segments each connecting the adjacent arcuate segments to form a generally C-shaped segment;

porous filter membranes each sealingly covering at least said support member intermediate section, each filter membrane defining on opposite sides thereof a dirty side and a clean side on which said intermediate section is positioned, said filter membrane including first and second annular filter membranes, said first filter membrane covering said intermediate section on the lower side of said first support member, said second filter membrane covering said intermediate section on the upper side of said second support member, said first filter membrane having an outer peripheral section hermetically sealed to said first support member outer frame, and an inner peripheral section, said second filter membrane having an outer peripheral section hermetically sealed to said second support member outer frame section, and an inner peripheral section hermetically sealed to the first filter membrane inner peripheral section; and means for causing fluid flow from said dirty side to said clean side so that fluid pressure is applied to press said membrane onto said ridges.

2. A filter as claimed in claim 1, wherein said support member boss section is formed with a plurality of first cut-out grooves each of which axially extends from lower surface of said boss section, each first cut-out groove communicating with the boss section central opening and continuous to each elongate groove in said intermediate section.

3. A filter as claimed in claim 2, further comprising means defining a first through-hole formed in said elongate groove in a manner to communicate said elongate groove on the upper side with said elongate groove on the lower side of said support member.

4. A filter as claimed in claim 3, wherein said corresponding curved ridges on the upper and lower sides are located symmetrical with respect to a central plane of said intermediate section which plane is parallel with the base surface of said intermediate section.

5. A filter as claimed in claim 4, wherein said curved ridges include first winding elongate ridges each having a first end connected to said outer frame section and a second end located in the vicinity of and separate from said boss section, and second winding elongate ridges each having a first end connected to said outer frame section and a second end connected to said boss section, wherein first and second elongate grooves are formed on opposite sides of each first winding elongate edge and joined to each other to be continuous to the central opening of said boss section, wherein said first through-hole is located in said first elongate groove on the upper and lower sides of said support member.

6. A filter as claimed in claim 5, further comprising means defining a second through-hole formed in said second elongate groove on the upper and lower sides of said support member.

7. A filter as claimed in claim 5, wherein said first winding elongate ridge is smaller in range of width of winding than said second winding elongate ridge.

8. A filter as claimed in claim 4, further comprising means defining a second through-hole formed in said elongate groove and located adjacent said first through-hole, said second through-hole communicating said elongate grooves on the upper and lower sides of said support member.

9. A filter as claimed in claim 2, wherein said support member boss section is formed with a plurality of second cut-out grooves each of which extends from upper surface of said boss section, each second cut-out groove communicating with the boss section central opening and continuous to each elongate groove only on the upper side of said support member, wherein each first cut-out groove is continuous to each elongate groove only on the lower side of the support member.

10. A filter as claimed in claim 9, wherein said curved ridge on the upper side and said curved ridge on the lower side shift from each other in a circumferential direction of said support member.

11. A filter as claimed in claim 1, further comprising an upper end plate located adjacent said support member at an upper-most position, and a lower end plate located adjacent said support member at a lower-most position, wherein said support members, said filter membranes and said upper and lower end plates constituting a filter element.

12. A filter as claimed in claim 11, further comprising a casing inside which said filter element is disposed, said casing being formed at its inner bottom wall with ribs.

13. A filter as claimed in claim 12, further comprising a spacer member fixedly interposed between said lower end plate and said ribs.

14. A filter as claimed in claim 13, wherein said ribs extend radially inwardly from inner wall of said casing and having respective inner ends which are separate from each other to define a central space communicated with a fluid inlet of the casing through which fluid to be filtered enters inside of said casing.

15. A filter as claimed in claim 14, wherein said spacer member includes an annular flange section having a predetermined thickness and positioned between said lower end plate and said ribs, and a cylindrical section positioned in said central space defined by the rib inner ends.

16. A filter as claimed in claim 14, wherein said lower end plate includes an annular projection in contact with said ribs, said annular projection projecting axially downwardly to be in contact with said ribs.

17. A filter as claimed in claim 11, further comprising a casing inside which said filter element is disposed, wherein said upper end plate includes a plurality of projections formed at an outer peripheral section of said upper end plate, said projections being in contact with an inner wall of said casing in a manner to prevent upward deformation of said upper end plate.

18. A filter as claimed in claim 17, wherein said projections extend radially outwardly to be located below and in contact with an annular section inwardly projecting from the inner wall of said casing.

19. A filter as claimed in claim 18, wherein said upper end plate is formed at the outer peripheral section with a plurality of grooves each extending radially inwardly to form a space between said upper end plate and said annular section.

20. A filter as claimed in claim 17, wherein said projections extend axially upwardly to be in contact with the inner wall of said casing.

21. A filter as claimed in claim 17, wherein said casing includes an air vent pipe through which gas within said casing is able to be vented out of said casing, said air vent pipe being located over said upper end plate.

22. A filter as claimed in claim 1, wherein said curved ridges include first winding elongate ridges each having a first end connected to said outer frame and a second end connected to said boss section, and second winding elongate ridges each having a first end connected to said outer frame and a second end located in the vicinity of and separate from said boss section.

23. A filter as claimed in claim 22, wherein each first winding elongate ridge is smaller in range of width of winding than each second winding elongate ridge.

24. A filter as claimed in claim 22, wherein first and second elongate grooves are formed on opposite sides of said second winding elongate ridge, said first and second elongate grooves being joined with each other at a location in the vicinity of said boss section and continuous to the boss section central opening.

25. A filter as claimed in claim 1, wherein each support member is disc-shaped and of one-piece structure.

26. A filter as claimed in claim 1, wherein level of top of each ridge is equal to or axially inside that of said boss section.

27. A filter as claimed in claim 1, wherein said support members are so disposed that said boss sections of adjacent said support members are in contact with each other.

28. A filter as claimed in claim 1, wherein said curved ridges include at least curved ridges each of which has a first end connected to said outer frame section, and a second end connected to said boss section.

29. A support member for a filter element, comprising:
a plurality of one-piece annular support members each of which includes an annular boss section having a central opening, an annular outer frame section, and an intermediate section radially outwardly extending between said boss section and said outer frame section, said plurality of support members including first and second support members, said first support member being located above said second support member;
means for securely disposing said support members one upon another in a manner that the central openings of said support members are axially aligned with each other;
means defining a plurality of curved and winding continuous ridges in said intermediate section on upper and lower sides of said support member, each of said ridges projecting axially from surface of base of said intermediate section to form a land, each ridge extending generally radially and having a first end extending toward said outer frame section, and a second end extending toward said boss section so as to form an elongate groove between adjacent said ridges, said elongate groove continuing to the central opening of said boss section, said ridges including ridges each having a plurality of arcuate segments generally parallel with each other, and a plurality of rounded segments each connecting the adjacent arcuate segments to form a generally C-shaped segment;
porous filter membranes each sealingly covering at least said support member intermediate section, each filter membrane defining on opposite sides thereof a dirty side and a clean side on which said intermediate section is positioned, said filter membrane including first and second annular filter membranes, said first filter membrane covering said intermediate section on the lower side of said first support member, said second filter membrane covering said intermediate section on the upper side of said second support member, said first filter membrane having an outer peripheral section hermetically sealed to said first support member outer frame, and an inner peripheral section, said second filter membrane having an outer peripheral section hermetically sealed to said second support member outer frame section, and an inner peripheral section hermetically sealed to the first filter membrane inner peripheral section; and
means for causing fluid to flow from said dirty side to said clean side so that fluid pressure is applied to press said membrane onto said ridges.

30. A support member for a filter membrane in use for a filter, comprising:
an annular boss section having a central opening;
an annular outer frame section;
an intermediate section radially outwardly extending between said boss section and said outer frame section, the filter membrane being supportable on said intermediate section; and
means defining a plurality of curved and winding continuous ridges in said intermediate section on upper and lower sides of said support member, each of said curved ridges projecting axially from surface of base of said intermediate section to form a land, each ridge extending generally radially and having a first end extending toward said outer frame section, and a second end extending toward said boss section so as to form an elongate groove between adjacent said ridges, said elongate groove continuing to the central opening of said boss section, said ridges including ridges each having a plurality of arcuate segments generally parallel with each other, and a plurality of rounded segments each connecting the adjacent arcuate segments to form a generally C-shaped segment.

* * * * *